United States Patent

Patzelt et al.

[11] 4,334,699
[45] Jun. 15, 1982

[54] CAP-LIKE COVER FOR AN AIR BAG INSTALLATION

[75] Inventors: Helmut Patzelt, Fellbach; Albert Seybold, Wendlingen; Volker Budde, Grosskarlbach, all of Fed. Rep. of Germany

[73] Assignee: Daimler-Benz Aktiengesellschaft, Stuttgart, Fed. Rep. of Germany

[21] Appl. No.: 121,457

[22] Filed: Feb. 14, 1980

[30] Foreign Application Priority Data

Feb. 14, 1979 [DE] Fed. Rep. of Germany ....... 2905618

[51] Int. Cl.³ ............................................. B60R 21/08
[52] U.S. Cl. ........................................ 280/731; 428/43
[58] Field of Search ....................... 280/731, 748, 750; 428/9, 12, 43; 150/52; 152/358, 361 R; 156/224, 437

[56] References Cited

U.S. PATENT DOCUMENTS

| | | | |
|---|---|---|---|
| 876,616 | 1/1908 | Zeglen | 152/358 X |
| 2,184,326 | 12/1939 | Thomas | 152/358 |
| 3,907,330 | 9/1975 | Kondo et al. | |
| 3,982,774 | 9/1976 | Ivashuk et al. | 280/731 X |
| 4,148,503 | 4/1979 | Shiratori et al. | 280/731 |

FOREIGN PATENT DOCUMENTS 609624  9/1960  Italy ................................. 280/731

*Primary Examiner*—Joseph F. Peters, Jr.
*Assistant Examiner*—Michael Mar
*Attorney, Agent, or Firm*—Craig and Antonelli

[57] ABSTRACT

A cap-like cover member clippable on a baseplate of a steering wheel, the cover member is formed of an elastic material and serves to cover an air bag installation disposed inside the steering wheel of a motor vehicle. The cover is adapted to rip open and unfold in the manner of the hindge along predetermined breaking lines when the air bag is deployed. A downwardly pulled edge of a cover member mounted at the steering wheel, when subjected to outwardly directed forces by an inflating air bag, is prevented from being subjected to deformation phenomena by retainers.

7 Claims, 3 Drawing Figures

CAP-LIKE COVER FOR AN AIR BAG INSTALLATION

BACKGROUND AND SUMMARY OF THE INVENTION

The present invention relates to a cover construction, and, more particularly, to a cap-like cover member for covering an air bag or gas cushion installation disposed inside a steering wheel of a motor vehicle with the cap-like cover member being made of an elastic material and being adapted to be clipped on to a baseplate and being adapted to rip or tear open along predetermined breaking lines when the air bag or gas cushion is deployed and unfold like a hinge.

In addition to stylistic constraints, a cover member of the aforementioned type must meet special requirements with respect to the strength thereof within a wide temperature range especially when the cover member is subjected to the forces which are limited to a short period of time when the air bag of the air bag installation is deployed. Thus, the material and wall thickness of the cover member must be made such that the cover rips open exactly along the predetermined breaking lines even at a low inflation pressure thereby enabling the air bag to be freely deployed without delay. On the other hand, the cover member must also be so constructed that it withstands the load to which it is exposed on opening without tearing and without scattering fragments. Additionally, the cover member must be easy to install and must likewise be easy to remove if necessary; however, the ease of installation must not conflict with the firm fit of the cover member.

The aim of the present invention essentially resides in providing a cover, of an elastic material, for an air bag installation disposed inside a steering wheel wherein deformation phenomena caused by an inflation of the stored air bag are prevented even at extremely high temperatures and forces.

In accordance with the cover member of the present invention, the cover member is constructed so as to ensure that even when the material begins to become brittle and at low temperatures, the cover member will reliably tear open. For this purpose, a cover member of the type described hereinabove is proposed, wherein, according to the present invention, a pulled down edge of the mounted cover member is prevented by retainers from exhibiting deformation phenomena when it is subjected to outwardly directed forces such as occur upon an inflation of the stored air bag.

In accordance with advantageous features of the present invention, the retainers are provided in the form of a highly tear-resistant continuous band which is embedded in the elastic material in a vicinity of an edge of the cover member. To achieve an especially good anchoring of the continuous band to the adjacent material, at least some sections of the continuous band are provided with a coarsely constructed fabric covering.

The cover of the present invention that tears along predetermined breaking lines so that, upon opening up, the cover member forms two flaps which are displaced outwardly so as to enable the stored air bag to be inflated. To increase the strength of the cover member in a vicinity of the flaps as well as the strength of the pivot axis of such flaps, the continuous band may be provided, on two opposite sides thereof, with fabric flaps sewn thereto. The fabric flaps, may, for example, be embedded in the elastic material in a vicinity of the flaps of the cover when the cover is manufactured.

It is also possible in accordance with the present invention, for the purposes of reinforcement, to provide retainers in the form of angled members mounted on the baseplate and abutting outer areas of the pulled down edge of the cover member. The angled members may be secured to a baseplate by fasteners such as, for example, screws with heads of the screws being protected against inadvertent loosening by, for example, paint.

Accordingly, it is an object of the present invention to provide a cover member for an air bag installation arranged at a steering wheel which avoids, by simple means, shortcomings and disadvantages encountered in the prior art.

Another object of the present invention resides in providing a cover member for an air bag installation arranged at a steering wheel which prevents the cover member from exhibiting deformation phenomena when the air bag installation is triggered.

A further object of the present invention resides in providing a cover member for an air bag installation arranged at a steering wheel which will reliably open when the air bag installation is triggered.

Yet another object of the present invention resides in providing a cover member for an air bag installation arranged at a steering wheel which ensures that no parts of the installation comes loose when the cover member is opened.

A still further object of the present invention resides in providing a cover member for an air bag installation arranged at a steering wheel which is simple in construction and therefore relatively inexpensive to to manufacture.

Another object of the present invention resides in providing a cover member for an air bag installation arranged at a steering wheel which ensures the reliable functioning of the air bag installation under all operating conditions.

These and other objects, features and advantages of the present invention will become more apparent when taken in connection with the accompanying drawings which show, for the purposes of illustration only, two embodiments in accordance with the present invention.

DETAILED DESCRIPTION OF THE DRAWINGS

Figure 1:
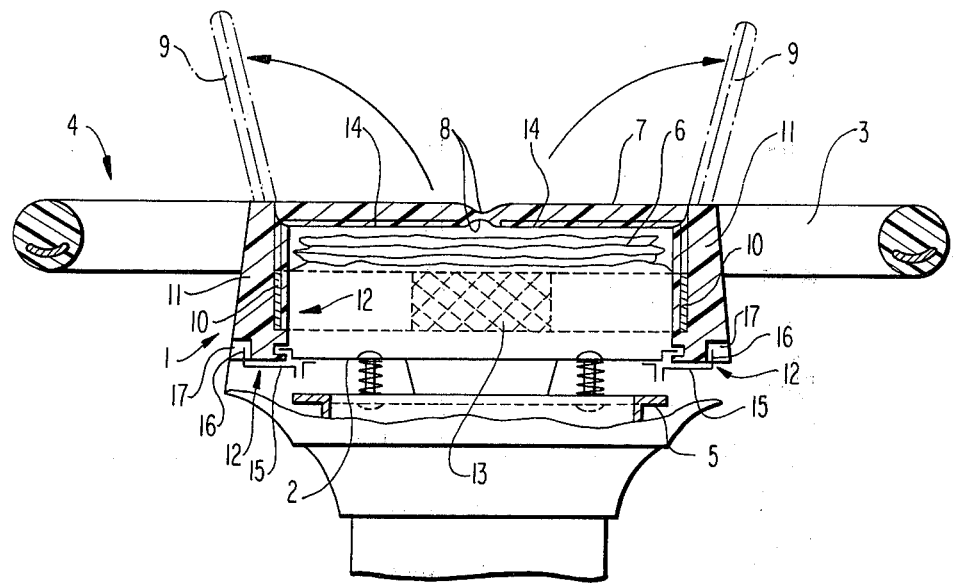
FIG. 1 is a partially schematic cross-sectional view through a steering wheel having an air bag installation arranged therein with the installation being covered over at the top of the steering wheel by a cover member in accordance with the present invention.

Referring now to the drawings wherein like reference numerals are used throughout the various views to designate like parts and, more particularly to FIG. 1, according to this Figure, a cover member generally designated by the reference numeral 1 made of an elastic material, is clipped to a baseplate 2 with the baseplate 2 being displaceable against spring pressure in an axial direction of the steering wheel relative to a shock absorber 5, connected with a rim of a steering wheel generally designated by the reference numeral 4, so as to operate a horn.

It is also possible, in a manner not illustrated, to connect the baseplate 2 firmly to the rim 3 of the steering wheel 4 and to provide an actuating means for the horn disposed outside of the cover member 1.

Figure 2:
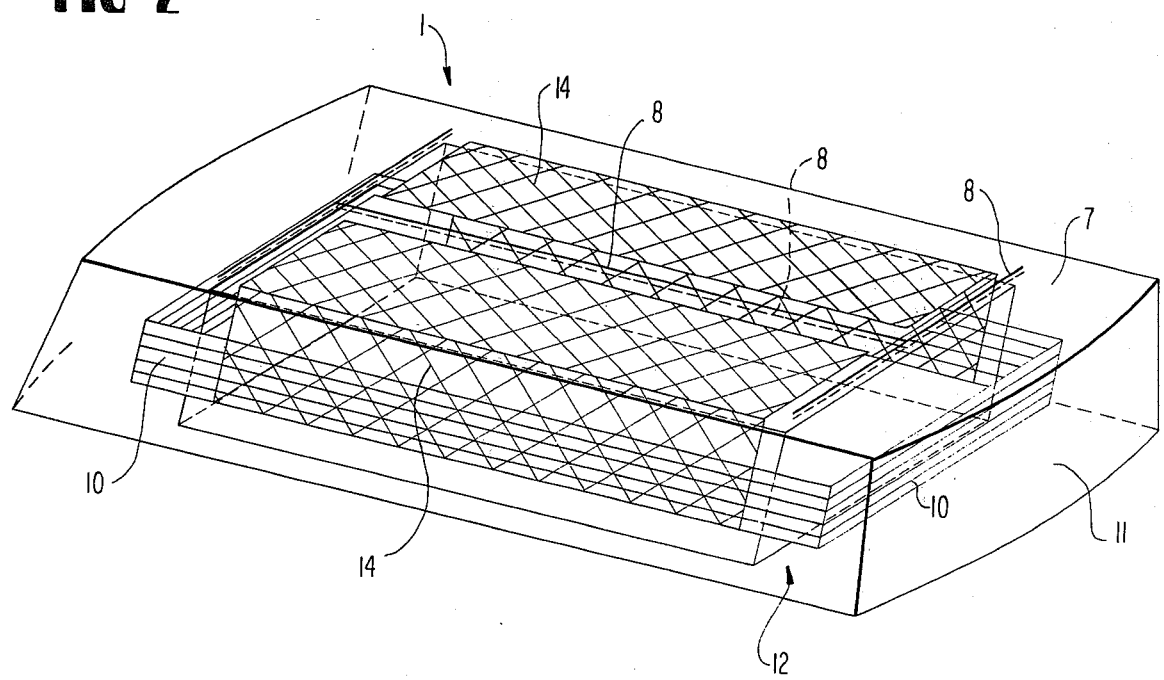
FIG. 2 is a perspective view of the cover member in accordance with the present invention.
Figure 3:
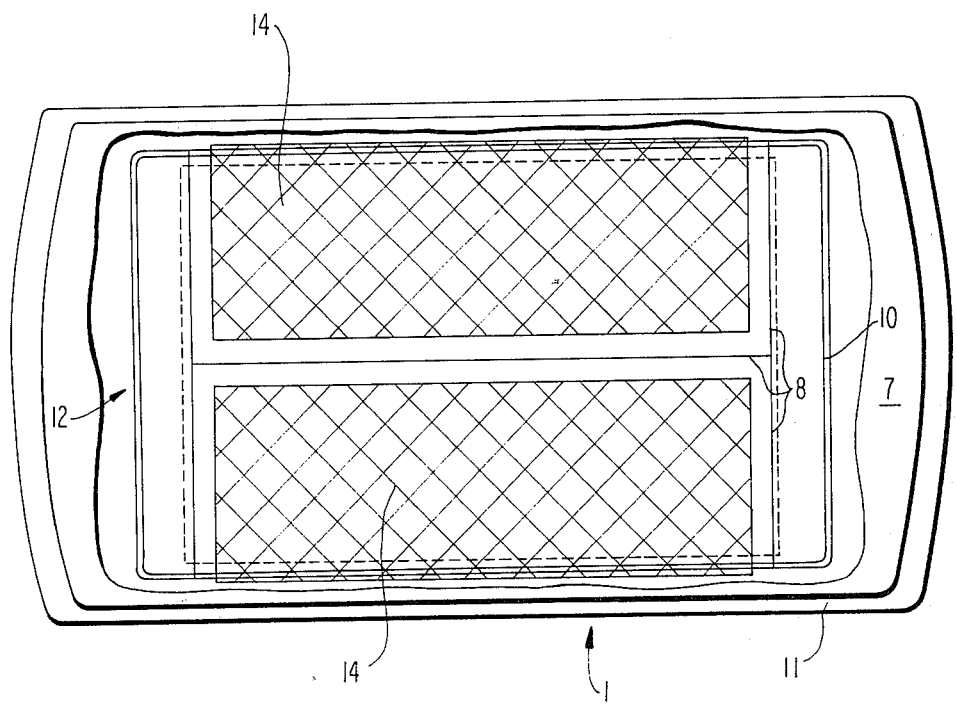
FIG. 3 is a cutaway top view of the cover member of the present invention.

The cover member 1 covers an air bag installation which includes a gas generator (not shown) and an air bag 6 which is stored in a folded condition within a housing of the steering wheel. Upon a triggering of the gas generator in a conventional manner, the air bag 6 is inflated and, when the inflation procedure begins, the inflation initiates a tearing or ripping of a top 7 of the cover member 1 along H-shaped predetermined breaking lines 8 (FIGS. 2 and 3), so that the top 7, as shown in phantom lines in FIG. 1, opens up forming two flaps thereby enabling the air bag 6 to be freely deployed.

A retainer generally designated by the reference numeral 12, which also serves to stabilize the cover member 1, is provided with a retainer serving the function of ensuring that the deformation phenomena, caused by the cover member 1 being influenced by outwardly directed forces which occur with an inflating air bag 6, may be avoided. For this purpose, the retainer 12 may include a band 10, made of a highly tear-resistant material, embedded in the elastic material of the cover member 1 in a vicinity of a pulled down or bent edge 11 of the cover member 1.

In order to produce an especially intimate connection with the elastic material of the cover member 1, the band 10 has at least one area provided with a fabric covering 13 (FIG. 1). The fabric covering 13 may be an especially coarse mesh fabric. To ensure that, even under unfavorable conditions, no parts of the air bag installation come loose when the cover member 1 is torn or ripped open, fabric flaps 14 are provided in a vicinity of the flaps 9 and are connected with the continuous band 10. The fabric flaps 14 are embedded in the elastic material of the cover member 1.

The retainer 12 may also be formed of angle members 15 connected by suitable fasteners, such as, for example, screws, with the baseplate 2. Free ends 16 of the angle members 15 abut outer areas 17 of the pulled down edge 11 of the cover member 1 and thereby contribute to, for example, preventing the entire cover member 1 from coming loose when, for example, the air bag 6 is inflated. The angle members 15 may also serve as a protection against inadvertent loosening or removal of the cover member 1 when the heads of the screws (not shown) which attach the angle members 15 to the baseplate are held in place by, for example, paint.

While we have shown and described only two embodiments in accordance with the present invention, it is understood that the same is not limited thereto but is susceptible to numerous changes and modifications as known to one having ordinary skill in the art, and we therefore do not wish to be limited to the details shown and described herein, but intend to cover all such modifications as are encompassed by the scope of the appended claims.

We claim:

1. A cap-like cover member for covering an air bag installation disposed inside a steering wheel of a motor vehicle, the cover member being made of an elastic material and being adapted to rip open along predetermined tearing lines so as to open along hinges when an air bag of the air bag installation is deployed, characterized in that the cover member includes downwardly bent edges adapted to be clipped on a baseplate mounted at the steering wheel, and in that retainer means are provided on the cover member for preventing the cover member from being subjected to deformation phenomena when the air bag is deployed, the retainer means includes a continuous band of highly tear-resistant material embedded in the elastic material of the cover member in a vicinity of the bent edge of the cover member.

2. A cap-like cover member according to claim 1, characterized in that a coarsely structured fabric covering is provided along at least certain sections of the continuous band to intimately connect the band to the cover member.

3. A cap-like cover member according to claim 2, characterized in that the predetermined tearing lines are arranged so that the cover member when ripped open forms flaps, and in that sewn on-fabric flaps are embedded in the elastic material of the cover member in a vicinity of the flaps of the cover member during manufacture of the cover member.

4. A cap-like cover member according to claim 3, characterized in that the retainer means further includes angle member adapted to be mounted on a baseplate of the steering wheel, the angle members including free ends adapted to abut an outer area of the bent edge of the cover member.

5. A cap-like cover member according to claim 4, characterized in that fastening means are provided for securing the angle members to the baseplate, and in that paint is applied to heads of the fastening means to prevent inadvertent loosening.

6. A cap-like cover member according to claim 1, characterized in that the predetermined tearing lines are arranged so that the cover member when ripped open forms flaps, and in that sewn on fabric flaps are embedded in the elastic material of the cover member in a vicinity of the flaps of the cover member during a manufacture of the cover member.

7. A cap-like cover member for covering an air bag installation disposed inside a steering wheel of a motor vehicle, the cover member being made of an elastic material and being adapted to rip open along predetermined tearing lines so as to open along hinges when an air bag of the air bag installation is deployed, characterized in that the cover member includes downwardly bent edges adapted to be clipped on a baseplate mounted at the steering wheel, and in that retainer means are provided on the cover member for preventing the cover member from being subjected to deformation phenomena when the air bag is deployed, characterized in that the retainer means includes angle members adapted to be mounted on a baseplate of the steering wheel, the angle members including free ends adapted to abut an outer area of the bent-edge of the cover member, the predetermined tearing lines are arranged so that the cover member when ripped open forms flaps, and in that sewn on fabric flaps are embedded in the elastic material of the cover member in a vicinity of the flaps of the cover member during a manufacture of the cover member.

* * * * *